United States Patent [19]
Matharani et al.

[11] 3,861,877
[45] Jan. 21, 1975

[54] OPTICAL ANALYSIS OF FLUIDS

[75] Inventors: Baldev A. Matharani, Medfield; Nathan M. Hirsch, Brookline, both of Mass.

[73] Assignee: Clinical Technology Incorporated, Brookline, Mass.

[22] Filed: Jan. 21, 1974

[21] Appl. No.: 434,791

[52] U.S. Cl. ........... 23/230 B, 23/230 R, 23/253 R, 73/61 R, 73/64.1, 356/39
[51] Int. Cl. ..................... G01n 33/16, G01n 21/24
[58] Field of Search ......... 23/230 B, 230 R, 253 R, 23/259; 356/39; 73/61.4, 64.1, 61 R

[56]  References Cited
UNITED STATES PATENTS

| | | | |
|---|---|---|---|
| 3,041,312 | 6/1962 | Boyd | 260/94.2 M X |
| 3,254,062 | 5/1966 | Forman | 260/94.3 M X |
| 3,410,836 | 11/1968 | Asith et al. | 94.2 M X/ |
| 3,432,268 | 3/1969 | Unger | 23/230 B |
| 3,463,614 | 8/1969 | Leslie | 23/230 B |
| 3,488,156 | 1/1970 | Good et al. | 73/64.1 X |
| 3,492,396 | 1/1970 | Dalton et al. | 73/64.1 X |
| 3,617,222 | 11/1971 | Matte | 23/230 B |

*Primary Examiner*—R. E. Serwin
*Attorney, Agent, or Firm*—Thomas N. Tarrant

[57]  ABSTRACT

Fluid analysis to determine precipitation, aggregation and agglutination or the like in which samples are taken from the least and most dense portions of a fluid and the two samples are read separately by an optical system and then the readings are processed in accordance with the formula $100(A-B/A+B)= X$ where A is the OD (optical density) of the denser sample, B is the OD of the less dense sample and X is the percentage of OD change due to precipitation, aggregation, agglutination or the like.

7 Claims, 1 Drawing Figure

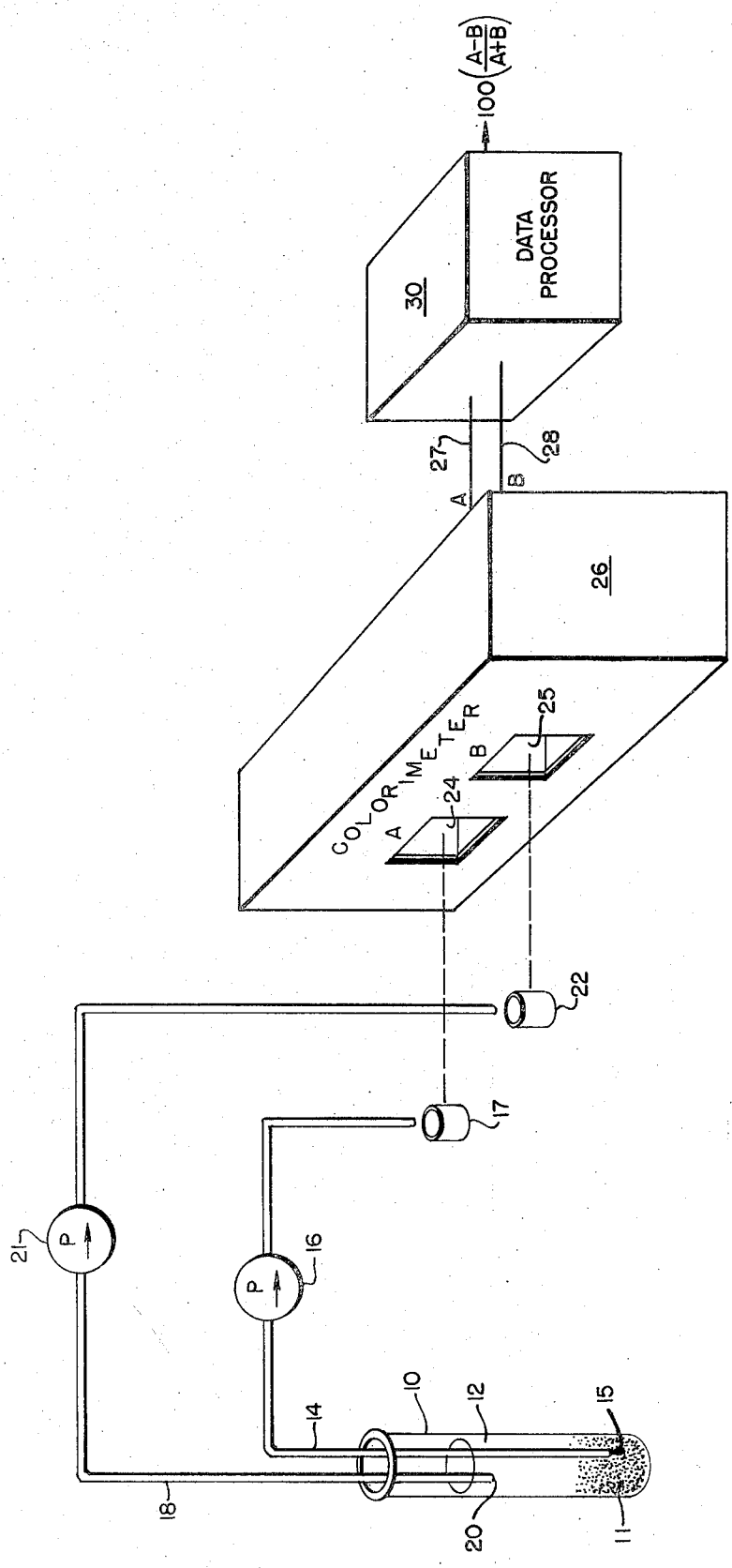

OPTICAL ANALYSIS OF FLUIDS

BACKGROUND OF THE INVENTION

1. Field of the Invention

The invention relates to Optical Analysis and particularly to analytical processes for determining the amount of precipitation, settling aggregation or agglutination in a liquid by optically processing the densities of the least and most dense portions of the liquid being analyzed.

2. Description of the Prior Art

It has been common in the past to use colorimeters to determine whether agglutination has occurred in blood. For the most part, these systems give yes or no answers — yes there is agglutination or no there is not. For some test purposes, that is quite adequate, but much greater information can be obtained if actual percentages of agglutination is known and in other types of chemical analysis, the exact percentage of, for example, precipitation, can be greatly desirable. One of the complications frequently encountered is variations in the optical density of the fluid being analyzed prior to any agglutination or settling. In U.S. Pat. No. 3,488,156 to Good, et al., readings of color density prior to the addition of reagents are disclosed in order to set a threshold for the yes or no answer. This eliminates a source of inaccuracy but still does not yield any kind of percentage answer.

In U.S. Pat. No. 3,617,222 to Matte, a system is described in which samples are taken from both the most dense and the least dense portions, both before and after agglutination, and comparing the colorimeter readings. Errors resulting from extraneous color factors are thus even more greatly reduced. However, again the answer is a yes or no answer. There is also the complication in systems such as those described, that colorimeter readings must be taken at more than one location in a series of processing steps.

SUMMARY OF THE INVENTION

In accordance with the present invention, liquid samples are withdrawn from a settled portion of a liquid and also from a supernatant portion and read separately in an optical analyzer after which the readings are processed so as to cancel out and/or minimize errors due to random or unspecific colorations of different liquids being analyzed. The processing involves subtracting the optical density of the supernatant sample from the optical density of the more dense sample and dividing this difference by the sum of the densities of the two samples. Multiplying the result by 100 gives the percentage density change. The term "density" as used herein is intended to include particle count density and optical density derived either from transmission or absorptiona. While the invention is useful for all types of analysis to determine precipitation, aggregation and the like, it has been found particularly useful in performance of the Antihuman Globulin Coombs test for blood to determine the percentage of agglutination. Thus, it is an object of the invention to provide a novel method of colorimetric analysis.

It is a further object of the invention to provide a system of optical analysis in which samples of the settled portions of a liquid and a supernatant portion are read by an optical analyzer and compared to determine the percentage of settling.

It is a further object of the invention to provide a system for measuring agglutination in performing the Antihuman Globulin Coombs test by processing optical analysis readings of a supernatant portion and an agglutinated portion of blood.

Further objects and features of the invention will be understood upon reading the following description together with the drawing.

BRIEF DESCRIPTION OF THE DRAWING

A diagrammatic illustration of a system for optical analysis in accordance with the invention using a colorimeter.

DESCRIPTION OF THE PREFERRED EMBODIMENT

The term aggregated as used herein is generic to agglomerated, agglutinated and the results of precipitation. It refers to any gathering together in a liquid medium of particular components having greater density than the medium average.

The invention has been found particularly useful in analyzing the results of an Antihuman Globulin Coombs test or other hemaglutination reaction, and the preferred embodiment will be described in relation to such a test. In the Coombs test, Coombs serum is added to a mixture of blood serum and red blood cells to facilitate agglutination to determine whether there are antibodies in the serum for corresponding antigens in the red blood cells. If the corresponding antigens and antibodies are present, agglutination of the red blood cells occurs causing them to settle. This settling is commonly aided by use of a centrifuge, but can be obtained by gravity. While the invention applies equally in both cases, gravitational settling is the mode used in the described embodiment. Thus, container 10 for blood is depicted in the drawing with agglutinated red blood cells 11 settled in the bottom and a supernatant fluid or serum 12 above blood cells 11. First tube 14 extends to the bottom of container 10 for withdrawing agglutinated blood cells. Pumping system 16 pumps a metered amount of agglutinated blood cells through tube 14 and into sample container 17. Second tube 18 has its orifice 20 near the top of the liquid carried in container 10 to withdraw a predetermined amount of the supernatant fluid. Pump system 21 is arranged to pump a metered amount of supernatant fluid 12, equal to the amount of agglutinated cells metered by pump 16, into sample container 22. Sample containers 17 and 22 are then introduced into adjacent channels 24 and 25 respectively of colorimeter 26. The colorimeter measures the transmittance or absorption, derives the optical density of each of the two samples and produces an output signal representative of the optical density in sample container 17 on output line 27. A signal representation of the optical density of the sample in container 22 is similarly given on output line 28. Lines 27 and 28 feed the optical density readings to small special purpose computer 30 which performs the arithmetical operation $100(A-B/A+B)$ where $A$ is the optical density of the sample in container 17 as found on colorimeter output 27 and $B$ is the optical density of the sample in container 22 as found on colorimeter output 28. The result of the arithmetical operation is the percentage change in optical density of the agglutinated sample due to agglutination. This has been found to be closely proportional to the percentage of red cells that have agglutinated.

For purposes of this disclosure, no detailed description is given of the different components of the system since they are individually disclosed in the prior art. For example, tubes 14 and 18, and an exemplary apparatus for operation thereof, are disclosed in U.S. Pat. No. 3,617,222 as probes 41 and 42. Plural channel colorimeters, special purpose computers, and interfacing therefore, are all even better known in the prior art and examples are unnecessary.

While the invention has been described with respect to a specific embodiment, many variations are contemplated. For example, instead of using separate sample holders for top and bottom samples, a single container can be utilized for both. Likewise a single channel colorimeter can be used to read the densities one after the other and the output of the colorimeter can be processed by any electrical, electronic, mechanical or other means that will effectuate the required arithmetic. Thus, it is intended to cover the invention within the full scope of the following claims.

1. A method for measuring the percentage change in optical density of a liquid due to aggregation of particular consitiuents comprising:
   a. determining the optical density of the aggregated portion of the liquid;
   b. determining the optical density of the unaggregated portion of the liquid; and,
   c. computing the percentage change in density of the aggregated portion due to aggregation in accordance with the formula $A-B/A+B \times 100 = \%$ density change where $A$ is the aggregated portion and B is an unaggregated portion both measured in optical density units.

2. A method of measuring according to claim 1 in which the liquid is blood and the aggregation is agglutination.

3. A method for measuring according to claim 1 in which the measuring of the aggregated portion is performed by extracting a sample from gravitationally settled portion of the liquid and examining it in an optical analyzer and measuring of the unaggregated portion is performed by extracting a sample from the supernatant portion of the liquid and examining it in an optical analyzer.

4. Apparatus for measuring aggregation of particular constituents in a liquid comprising:
   a. means to aggregate relatively dense constituents of a liquid;
   b. means to extract a sample of the aggregated constituents;
   c. means to extract a sample of the supernatant liquid;
   c. means to measure the optical density of the aggregate sample and of the supernatant sample; and
   e. means to produce the optical densities of the two samples in accordance with the formula $A-B/A+B$ where $A$ is the optical density of the aggregated sample and $B$ is the optical density of the supernatant sample whereby a percentage change in concentration of the aggregated sample, due to aggregation, is derived.

5. Apparatus for measuring, according to claim 4, in which the means for aggregating the more dense constituents is a container permitting gravitational settling.

6. Apparatus for measuring, according to claim 5, in which the aggregated sample and the supernatant sample are extracted from the bottom and top portions of said container respectively.

7. A method for determining the change in concentration of particular colored constituents in a contained liquid due to precipitation, settling, aggregation, agglutination or the like comprising:
   a. taking a first sample from substantially the bottom of a container of said liquid;
   b. taking a second sample from substantially the top of said container;
   c. optically processing both said first sample and said second sample to obtain their optical densities; and,
   d. arithmetically processing the optical densities so obtained in accordance with the formula $100(A-B/A+B)$ where $A$ is the optical density of the first sample, $B$ is the optical density of the second sample and the result is the percentage change in concentration of colored constituents.

* * * * *